(12) United States Patent
Zakharov

(10) Patent No.: US 10,949,193 B2
(45) Date of Patent: *Mar. 16, 2021

(54) SYSTEM AND METHOD OF UPDATING ACTIVE AND PASSIVE AGENTS IN A NETWORK

(71) Applicant: AO Kaspersky Lab, Moscow (RU)

(72) Inventor: Evgeny S. Zakharov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 47 days.

This patent is subject to a terminal disclaimer.

(21) Appl. No.: 16/414,985

(22) Filed: May 17, 2019

(65) Prior Publication Data

US 2019/0272165 A1 Sep. 5, 2019

Related U.S. Application Data

(63) Continuation of application No. 15/417,828, filed on Jan. 27, 2017, now Pat. No. 10,338,909.

(30) Foreign Application Priority Data

Sep. 8, 2016 (RU) .......................... RU2016136225

(51) Int. Cl.
*H04L 29/06* (2006.01)
*G06F 8/65* (2018.01)
*H04L 29/08* (2006.01)
*G06F 12/08* (2016.01)

(52) U.S. Cl.
CPC .............. *G06F 8/65* (2013.01); *H04L 63/1433* (2013.01); *H04L 63/20* (2013.01); *H04L 67/10* (2013.01); *H04L 67/34* (2013.01)

(58) Field of Classification Search
CPC ....... G06F 8/65; H04L 63/1433; H04L 64/20; H04L 67/34; H04L 67/10
See application file for complete search history.

(56) References Cited

U.S. PATENT DOCUMENTS

| 5,838,635 | A | 11/1998 | Masreliez |
| 6,463,513 | B1 | 10/2002 | Bish |
| 7,546,595 | B1 | 6/2009 | Wickham et al. |
| 7,555,551 | B1 | 6/2009 | McCorkendale et al. |
| 7,770,168 | B1 | 8/2010 | Howarth et al. |
| 7,853,609 | B2 * | 12/2010 | Dehghan ................. H04L 67/34 707/778 |

(Continued)

*Primary Examiner* — Michael Simitoski
(74) *Attorney, Agent, or Firm* — Arent Fox LLP; Michael Fainberg

(57) ABSTRACT

Disclosed is a system and method of updating active and passive agents in a network. The system includes a hardware processor configured to designate a unique identifier for each of a plurality of terminal node in a network of computing devices, broadcast the identifiers, collect criteria from the nodes, the criteria characterizing each node and a set of unique identifiers for other nodes in a same broadcast domain as the terminal node, generate a list of nodes that are active update agents and a list of nodes that are passive update agents based on the collected criteria, transmit one or more updates of a security application installed on the each terminal node to each terminal node that is an active update agent, and transmit from each terminal node that is an active update agent, the one or more updates to each terminal node that is a passive update agent.

20 Claims, 4 Drawing Sheets

(56) References Cited

U.S. PATENT DOCUMENTS

| | | | |
|---|---|---|---|
| 8,688,803 B2 | 4/2014 | Manion et al. | |
| 9,223,562 B1 | 12/2015 | Sobel | |
| 9,489,193 B2 | 11/2016 | Reynolds | |
| 9,575,741 B2 | 2/2017 | Chinnappan et al. | |
| 9,830,141 B2 | 11/2017 | Cairns et al. | |
| 2004/0006586 A1 | 1/2004 | Melchione et al. | |
| 2004/0267930 A1 | 12/2004 | Giulio et al. | |
| 2005/0010916 A1 | 1/2005 | Hagen et al. | |
| 2005/0203968 A1 | 9/2005 | Dehghan et al. | |
| 2007/0022087 A1 | 1/2007 | Bahar et al. | |
| 2007/0118549 A1 | 5/2007 | Bornhoevd et al. | |
| 2007/0143851 A1* | 6/2007 | Nicodemus | H04L 63/105 726/25 |
| 2011/0202633 A1 | 8/2011 | Koike et al. | |
| 2011/0321031 A1 | 12/2011 | Dournov et al. | |
| 2013/0227114 A1* | 8/2013 | Vasseur | H04L 41/044 709/224 |
| 2013/0326494 A1 | 12/2013 | Nunez | |
| 2014/0092781 A1* | 4/2014 | Tan | H04W 76/14 370/259 |
| 2014/0304695 A1 | 10/2014 | Gambardella et al. | |
| 2015/0033292 A1* | 1/2015 | Nguyen | H04L 63/10 726/4 |
| 2016/0127193 A1* | 5/2016 | Deniaud | H04L 45/74 709/208 |
| 2016/0156638 A1* | 6/2016 | Somani | H04W 12/12 726/7 |
| 2016/0248859 A1* | 8/2016 | Jacquenet | H04L 41/0816 |
| 2016/0294800 A1 | 10/2016 | Oppenheim et al. | |
| 2017/0093687 A1* | 3/2017 | Wu | H04W 40/246 |
| 2018/0143819 A1 | 5/2018 | Gross et al. | |

* cited by examiner

SYSTEM AND METHOD OF UPDATING ACTIVE AND PASSIVE AGENTS IN A NETWORK

CROSS-REFERENCE TO RELATED APPLICATIONS

This application is a continuation of U.S. patent application Ser. No. 15/417,828, filed on Jan. 27, 2017, which further claims benefit of priority under 35 U.S.C. 119(a)-(d) to a Russian Patent Application No. 2016136225 filed Sep. 8, 2016, which is incorporated by reference herein.

FIELD OF TECHNOLOGY

The disclosure relates generally to the field of software and, more particularly to systems and methods of distributing software updates.

BACKGROUND

Most software installed on computers today is capable of being automatically updated by way of a local or remote software update tool. For example, the Windows operating system and Microsoft's software application suites (such as Microsoft Office) are updatable by way of software update tools such as Windows Update or Office Update. These update tools employ remote computers (such as servers connected to the Internet) to check for whether new versions of operating system and/or application software components are available. If so, the update tools may be utilized to automatically download and install all the files necessary to update the components to their new versions.

Existing software update tools may not only be used to install updated versions of individual components, but also to perform an overall update of the operating system or of application software. For example, on a computer running Windows 8, Windows Update is not only capable of updating individual components of Windows 8, but of updating Windows 8 to Windows 10.

Different software applications utilize different updating methods. Some applications are updated with the use of patches (files containing only new versions of components). Other applications may be updated using download distributions kits that contain an entire updated version. Some applications have update tools that target not only executable components, but also other necessary data for proper operation. For example, anti-malware applications utilize tools that are capable of updating individual software modules, performing an overall application update when switching to a new version, and of updating the data libraries needed to detect malicious software several times a day.

Notably, the size and sophistication of internal computer networks utilized by businesses and other entities and organizations has been steadily increasing. Local computer networks today may employ any one, or combination, of a multitude of different possible network topologies, and are increasingly connected to larger global networks. It is common for larger organizations with various local offices to have separate local area networks serving each office that are connected to one another via the Internet. Such organizations may find it desirable to be able to update the operating system and application software installed on each local workstation computer to reduce the risks of losing confidential data to hackers exploiting vulnerabilities in outdated software versions.

The increasing size of computer networks, combined with the increased variety and complexity of network topologies and the need to update software often, has resulted in increased bandwidth and network overhead costs to organizations. For example, using a remote server to update the software installed on each computer in a local area network of an organization can result in a significant increase in the amount of traffic on the local area network. The more computers are in the network the greater the amount of network bandwidth required to complete the updates without disrupting the proper functioning of the network. A remote update of 100 or more computers could easily increase the amount of traffic on the local area network by an order of magnitude. To deal with such increases in network traffic, organizations must adjust their bandwidth capabilities, which leads to increased network overhead costs. Furthermore, transferring the large amounts of data required to perform frequent software updates to multiple local workstations via a remote server takes significantly longer than transferring the same amount of data between computers within the local area network.

These problems may be solved, in part, by using local (as opposed to remote) update servers to reduce the volume of required traffic and increase the speed of distribution of software updates throughout the local area network.

However, computer networks are often divided into administration groups by the system administrator. Administrative group divisions do not necessarily, and often do not, take network topology into account. This results in the creation of administration groups that may comprise local workstations that reside in different local area network. As a result, a local update server assigned to an administration group may still be tasked with updating one or more computers that reside in one or more different local area networks, resulting in similar increased network traffic and attendant expenditures as would be caused by using a remote server.

There is a need in the art for a system and method for distributing software updates within a network segment that provides for a more efficient distribution of traffic within networks with complex topologies and administrative groups.

SUMMARY

Disclosed is a system and method for distributing software updates to terminal nodes in a network. In one exemplary aspect, a system for distributing software updates to terminal nodes in a network comprises a network administration server comprising a processor configured to: install on a plurality of terminal nodes in the network security applications configured to at least manage security of said terminal nodes; receive from the security applications installed on the plurality of terminal nodes in the network criteria characterizing the terminal nodes on which said security applications are installed and identifiers of other terminal nodes in broadcast domains of the terminal nodes on which said security applications are installed; based on the criteria characterizing the terminal nodes, select terminal nodes to be used as active and passive update agents for each broadcast domain, wherein an active update agent is configured to receive software updates from the network administration server and other update agents, and a passive update agent is configured to receive software updates from other update agents only; and transmit to the security applications of the selected active update agents for each broadcast domain in the network, one or more software updates for further distribution of the software updates by the active update agents to one or more passive update agents and the plurality of terminal nodes in the same broadcast domain.

In one exemplary aspect, the active and passive update agents further configured to transmit received software updates to other update agents and to the terminal nodes in the network.

In one exemplary aspect, the criteria includes CPU speed of the terminal node.

In one exemplary aspect, the criteria includes the amount of free memory remaining on terminal node.

In one exemplary aspect, the criteria includes the domain suffix of the URL assigned to the terminal node.

In one exemplary aspect, the criteria includes information assessing the vulnerability of the terminal node to a malware attack.

In one exemplary aspect, the criteria includes the amount of time the terminal node has been in uninterrupted operation.

In one exemplary aspect, the criteria includes information identifying the account of a user that is utilizing the terminal node.

In one exemplary aspect, the criteria includes whether a built-in battery is present on the terminal node.

In one exemplary aspect, the network administration server is configured to change active update agent to a passive update agent based on one or more of the criteria.

In one exemplary aspect, the network administration server determines the number of update agents based on the number of terminal nodes in the broadcast domain.

In one exemplary aspect, the network administration server is further configured to select an active and passive update agent for an administration group, which includes a set of terminal nodes having identical network security policies.

In another exemplary aspect, a method for distributing software updates to terminal nodes in a network comprises: installing, by a network administration server, on a plurality of terminal nodes in the network, security applications configured to at least manage security of said terminal nodes; receiving, by the network administration server, from the security applications installed on the plurality of terminal nodes in the network, criteria characterizing the terminal nodes on which said security applications are installed and identifiers of other terminal nodes in broadcast domains of the terminal nodes on which said security applications are installed; based on the criteria characterizing the terminal nodes, selecting, by the network administration server, terminal nodes to be used as active and passive update agents for each broadcast domain, wherein an active update agent is configured to receive software updates from the network administration server and other update agents, and a passive update agent is configured to receive software updates from other update agents only; and transmitting, by the network administration server, to the security applications of the selected active update agents for each broadcast domain in the network, one or more software updates for further distribution of the software updates by the active update agents to one or more passive update agents and the plurality of terminal nodes in the same broadcast domain.

In another exemplary aspect, a non-transitory computer readable medium storing computer readable instructions for distributing software updates to terminal nodes in a network, includes instructions for: installing, by a network administration server, on a plurality of terminal nodes in the network, security applications configured to at least manage security of said terminal nodes; receiving, by the network administration server, from the security applications installed on the plurality of terminal nodes in the network, criteria characterizing the terminal nodes on which said security applications are installed and identifiers of other terminal nodes in broadcast domains of the terminal nodes on which said security applications are installed; based on the criteria characterizing the terminal nodes, selecting, by the network administration server, terminal nodes to be used as active and passive update agents for each broadcast domain, wherein an active update agent is configured to receive software updates from the network administration server and other update agents, and a passive update agent is configured to receive software updates from other update agents only; and transmitting, by the network administration server, to the security applications of the selected active update agents for each broadcast domain in the network, one or more software updates for further distribution of the software updates by the active update agents to one or more passive update agents and the plurality of terminal nodes in the same broadcast domain.

The above simplified summary of the exemplary aspects of the present invention disclosed herein is intended to provide a basic understanding of the present disclosure. This summary is not intended to provide a detailed overview of all contemplated aspects of the present invention, nor is it intended to identify key or critical elements of the present invention or to delineate the scope of any or all aspects of the present disclosure. The sole purpose of this summary is to present one or more exemplary aspects of the present invention in a simplified form as a prelude to the more detailed description of the disclosure that follows.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein of a system, method, and computer program product for distributing software updates. Those of ordinary skill in the art will appreciate that the following description is illustrative only, and is not intended to be in any way limiting. Other aspects will readily suggest themselves to those skilled in the art having the benefit of this disclosure. What follows is a detailed description of exemplary aspects of the present invention as illustrated in the accompanying drawings. The same reference indicators will be used to the extent possible to refer to the same or like items throughout the drawings and the detailed description below.

Figure 1:
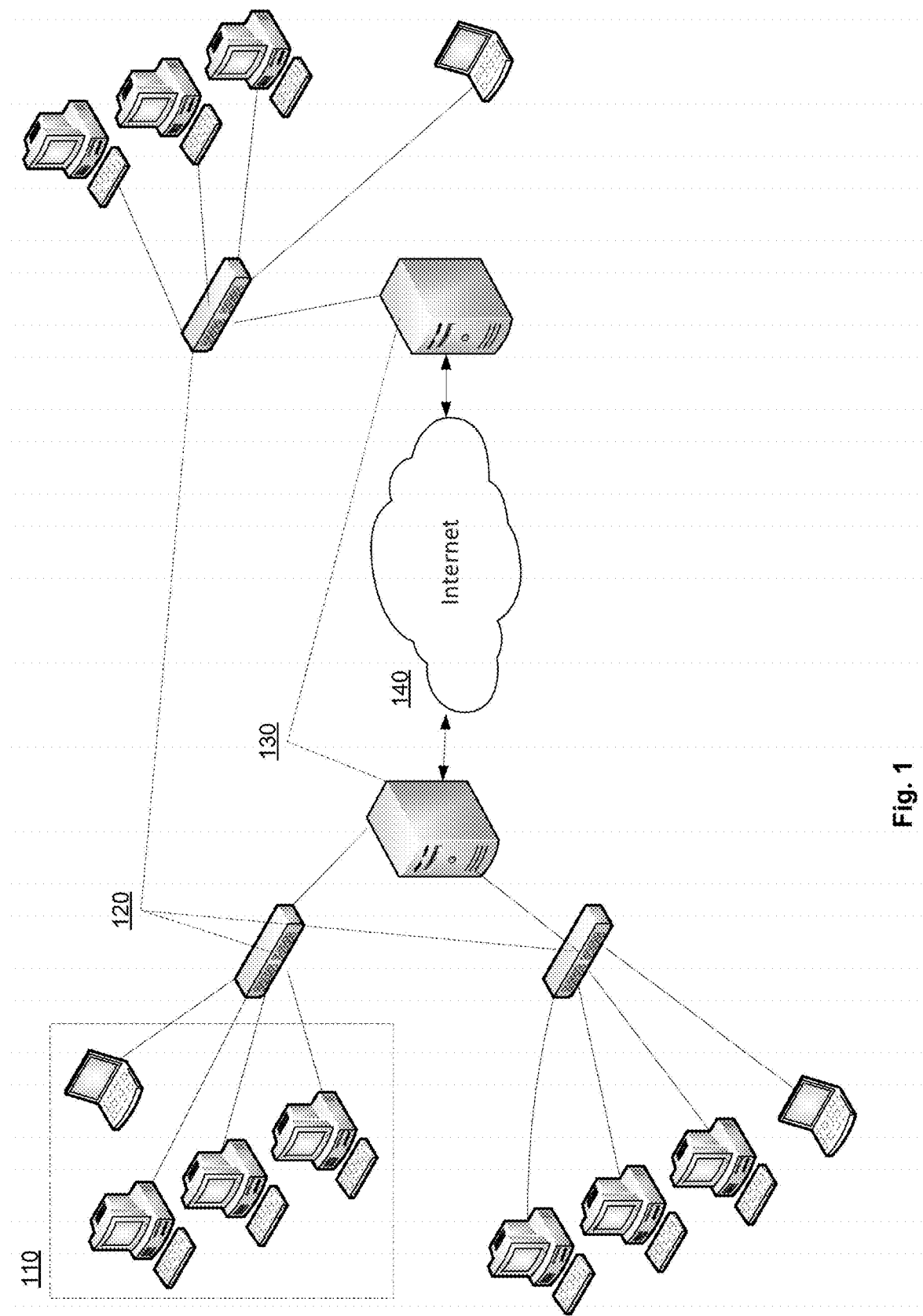
FIG. 1 is a diagram of an example of topology of a local area network of an organization.

FIG. 1 shows an example of a typical local area network topology. The local area network comprises terminal network nodes 110, which may be computing devices (e.g., servers, stationary computers, notebooks, mobile telephones, etc.), linked by switching devices 120 (e.g., switches, access points, routers, etc.). Each network and subnetwork may have its own similar or different topology. In the example shown in FIG. 1, the network topology has a graph configuration, the vertices of which correspond to the terminal network nodes 110 and switching devices 120, while the edges correspond to the links between the vertices. It should be noted that, terms "terminal network nodes" and "terminal nodes" will be used interchangeably herein. The networks and subnetworks may be linked by gateways 130 and the Internet 140. In certain implementations, the gateways 130 may be separate computers, while in others the gateways 130 may be separate devices, such as routers.

The terminal network nodes 110 of different local area networks of an organization may exchange data via the Internet 140, while the local area networks may be situated either in different parts of the same city or in different regions of the same country or also in different countries.

When the terminal network nodes 110 receive updates, e.g., updates of software components, the network traffic between the terminal network nodes 110 and the servers distributing the updates increases in a linear manner, as each terminal network node 110 (e.g., the computers of a certain subnetwork of the organization having a set of installed operating systems and application programs) receives identical updates, which may be stored and/or distributed by remote servers on the Internet 140.

Figure 2:
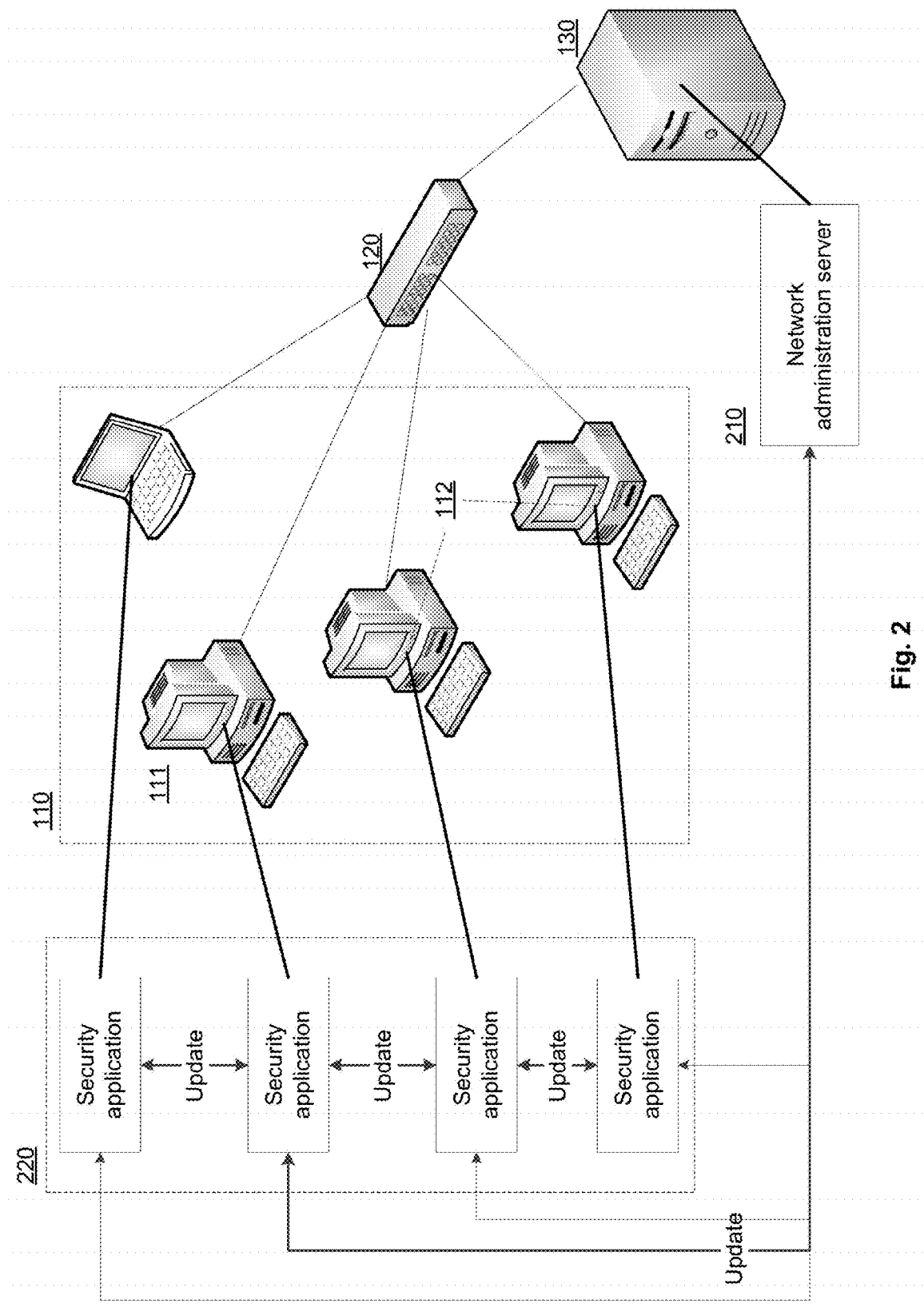
FIG. 2 is a diagram illustrating an exemplary method for distributing software updates to terminal nodes in a network.

FIG. 2 shows an exemplary method for updating software within an organization's network. Network administration servers 210 typically form part of the system that ensures the security of a local area network by, for example, providing antivirus software for corporate users, such as Kaspersky Endpoint Security. A network administration server 210 may be a component of an organization's corporate software. Network administration server 210 may run on one or more of the organization's network servers that exchange data with security applications 220 installed on the terminal network nodes 110. The data transmitted by the network administration server 210 to the security applications 220 may contain, for example, the network's security policies (such as, e.g., when to scan the terminal network nodes 110 for the presence of malicious software, or when to perform a security software update, etc.). The data of the security applications 220 that is transmitted to the network administration server 210 may contain, for example, data concerning the detection of malicious software on the terminal network node 110, as well as reports on the running of the security application 220.

The data which the network administration server 210 may exchange with the security applications 220 is not limited to the aforementioned examples. For example, the network administration server 210 may also transmit software updates through the network to the security applications 220. In another example, the network administration server 210 may transmit data through the network to the security applications 220 that contains lists of updates and of addresses where the updates may be obtained.

In one exemplary aspect, the network administration server 210 may assign a unique identifier to each terminal node 110 (for example, a computer of the network). The network administration server 210 and the security application 220 may be linked together and exchange data using the TCP protocol. The identifier in one exemplary aspect may be a whole number. All terminal nodes 110 may periodically broadcast data to the network using the security application 220. Broadcast messages may be received only by terminal nodes 110 located in the same broadcast domain. A broadcast domain is a segment or subnet of a particular wide-area or local-area network that connects terminal network nodes 110, between which there is no gateway 130. In one exemplary aspect, broadcasts may be accomplished using the UDP protocol, and may contain the aforementioned unique identifier, assigned by the network administration server 210. In one exemplary aspect, the broadcasting may be repeated periodically. The frequency with which the broadcasting is repeated (the "broadcasting period") may be determined by the network administration server 210, may have a constant value (e.g., 2 hours), or may be calculated by the network administration server 210 and depend on the size of the network. For example, the broadcasting period may be increased by 10 minutes for every 10 terminal nodes 110. Thus, if a network has 100 terminal nodes 110, the broadcasting may be performed by each terminal node 110 once every 1 hour and 40 minutes. The total number of terminal nodes 110 in the network may be known to the network administration server 210, and once calculated a value representing the broadcasting period may be transmitted to the security applications 220.

In one exemplary aspect, the security application 220 may periodically transmit to the network administration server 210 the set of identifiers corresponding to the other terminal network nodes 110 received as a result of the broadcasting. The frequency with which the identifiers are transmitted (the "identifier transmission period") may be determined by the network administration server 210, and may be equal to the broadcasting period, or alternatively may be calculated by the network administration server 210 based on the number of terminal network nodes 110.

In one exemplary aspect, the security application 220 periodically collects data about the terminal network node 110. This data, in an exemplary aspect, containing "criteria" that characterize the mentioned terminal network node 110. A "criterion" is a characteristic of the terminal network node 110 that may describe the node's operating speed, its location in the network, and/or the purpose of its use. More specifically, the criteria characterizing the terminal network node 110 may include, but are not limited to:

- the speed of the CPU of the terminal network node 110;
- the amount of free space on the hard drives of the terminal network node 110;
- the domain suffix of the name of the terminal network node 110;
- the presence of vulnerabilities in the software installed on the terminal node 110;
- the time of uninterrupted operation or "uptime" of the terminal network node 110;
- the account of the user using the terminal network node 110; and
- the presence of a built-in battery in the terminal network node 110.

After obtaining data concerning the criteria of the terminal network node 110, the security application 220 may transmit said criteria data to the network administration server 210. In one exemplary aspect, the security application 220 may transmit the criteria along with unique identifiers associated with the other terminal network nodes 110.

In one exemplary aspect, the network administration server 210 forms a table of records describing the broadcast domains of the network on the basis of the data received from each security application 220, said data containing the set of unique identifiers of the other terminal network nodes 110. The broadcast domain may contain two or more terminal nodes 110. Within a broadcast domain, the terminal network nodes 110 are visible to each other, wherein a first and a second terminal network node 110 are considered to be visible to each other if the network administration server 210 has obtained the identifier of the second terminal network node 110 from the first terminal network node 110 and the identifier of the first terminal network node 110 from the second terminal network node 110. The record associated with each broadcast domain in the table contains the identifiers of all the terminal network nodes 110 of the network segment that are visible to the other terminal nodes.

Moreover, the network administration server 210, based on the criteria data characterizing the terminal nodes 110 obtained from the security applications 220, selects update agents for each broadcast domain and generates a list of selected update agents for each broadcast domain. An update agent is one of the terminal nodes 110 of the broadcast domain whose identifier is contained in a record of the table, and which configured to transmit software updates to other terminal network nodes 110 within the broadcast domain.

In one exemplary aspect, the update agents may be active 111 and/or passive 112. An active update agent 112 is a terminal network node 110 of a broadcast domain which is designed to receive updates from the network administration server 210 and other update agents (both active 111 and passive 112). A passive update agent 112 is a terminal network node 110 of a broadcast domain which is designed to receive updates only from active agents 111 and other passive agents 112. The update agents (both active 111 and passive 112) may distribute updates to other active agents 111, to other passive agents 112 and to the terminal network nodes 110 (which are not update agents) within the broadcast domain.

The terminal network node 110 criteria may be taken into consideration by the network administration server 210 when selecting which terminal nodes 110 will be selected as update agents for each broadcast domain. Thus, for example, in one exemplary aspect, a computer with a processor of insufficient performance may not be designated as an update agent. In another exemplary aspect, a computer having inadequate free space on its hard drive (e.g., less than 50 Gb) may not be designated as an update agent. It may also be undesirable to designate as an update agent a computer which is, for example, a mail server (which may be determined by the domain suffix), one which is vulnerable (e.g., which has a large number of registered incidents of being infected by malicious applications), one which is constantly turned off (on average, it is turned on less than three hours a day), or one which is the working computer of some persons in the organization (such as the accountant, the network administrator or the managing director). It is also often incorrect to designate as an update agent a notebook (determined by the presence of a built-in battery), which is a mobile terminal node 110 whose computing resources should not be overloaded.

In one exemplary aspect, the update may be a file containing the new version of a component of the operating system. In another exemplary aspect, the update may be a file containing the new version of a component of the security application. In yet another exemplary aspect, the update may be a file containing the new version of a component of an application installed on the terminal network node 110.

It should be noted that in one exemplary aspect, the number of update agents in the list formed by the network administration server 210 may be calculated on the basis of the number of terminal network nodes 110 present in the broadcast domain. In another exemplary aspect, the number of update agents may be limited by a threshold value (e.g., the minimum number of update agents in the broadcast domain may not be less than 6).

In another exemplary aspect, the list of update agents may be generated periodically. If an update agent "drops out" from the network (i.e., has stopped responding to requests as a result of, for example, being turned off), or if an update agent no longer complies with the aforementioned criteria, the network administration server 210 may generate a new list in which said update agent is identified as an ordinary terminal network node 110 that no longer performs the functions of distributing updates, and in its place a different update agent may be selected by the network administration server 210 and added to the list of update agents.

In one exemplary aspect, the network administration server 210 may transmit to the security applications 220 the list of identifiers of the passive 112 and active 111 update agents that are located in the same broadcast domain as the one in which the terminal network node 110 with the installed security application 220 is located.

In one exemplary aspect, the active update agent 111 may be designated as being the agent that first requested an update from the network administration server 210. In another exemplary aspect, the network administration server 210 may designate as the active update agent 111 a terminal node 110 taking into consideration the criteria (such as the most powerful one or the one having the most free space on its hard drives). The network administration server 210 may designate at least one active agent 111 or alternatively may designate at least one passive agent 112 within each broadcast domain.

In one exemplary aspect, the network administration server 210 may transmit the update file through the network to the security application 220 of the active agent 111. In another exemplary aspect, said update is not transmitted by the network administration server 210 to the security applications 220 of the other active agents 111 if more than one active agent 111 has been designated within the broadcast domain.

In one exemplary aspect, the active update agents 111 may receive updates from other agents or from the network administration server 210 and at the same time may transmit updates to other update agents or to terminal network nodes 110. More specifically, the security application 220 of an active agent 111 may transmit the update to the security applications 220 of the other active agents 111, to the security applications 220 of the passive agents 112 and/or to the security applications 220 of other terminal network nodes 110 that are neither active 111 nor passive 112 agents.

In one exemplary aspect, the security application 220 of a passive agent 112 may transmit said update to the security applications 220 of the other active agents 111 (which have not received the mentioned update from the network administration server 210 or other active agents 111), to the security applications 220 of the passive agents 112 and/or to the security applications 220 of other terminal network nodes 110 that are neither active 111 nor passive 112 agents.

In an exemplary aspect, the network administration server 210 may designate an active agent 111 as passive 112, and a passive agent 112 as active 111. For example, if an active agent 111 has "dropped out" from the network (been turned off, or is malfunctioning), the network administration server 210 may designate another active agent 111 from among the passive agents 112 or the other terminal network nodes 110.

In another exemplary aspect, the network administration server 210 may redesignate active update agents 111 as passive agents 112, so that multiple agents are not unnecessarily active 111 at the same time. For example, if new updates seldom arrive at the network administration server 210 (e.g., one new update every three days), all the active agents 111 may be designated as passive 112. In another exemplary aspect, if a particular passive update agent 112 receives a request from another terminal network node 110 to transmit a new update, and the network administration server 210 determines that there are no active update agents 111 present or available, the network administration server 210 may transmit the address of another active update agent 111 (if another active update agent 111 has been designated prior to this), or the passive agent 112 itself is designated as active 111 and receives the new update from the network administration server 210.

In yet another exemplary aspect, the network administration server 210 when designating a new active update agent 111 initiates a scan of the network (e.g., by transmitting a command via the TCP protocol) to other active update agents 111. The scan is performed by the active update agents 111 to determine the possibility of using a new active update agent 111 as the source for receiving updates (for example, according to the visibility of the terminal network nodes 110 within the broadcast domain). In the event that this possibility exists, the active update agent 111 is designated by the network administration server 210 as passive 112.

It should be noted that the present invention is not limited to broadcast domains. Thus, for example, if the terminal network nodes 110 are combined into administration groups, update agents may be designated within such groups (both active 111 and passive 112). An administration group is a set of terminal network nodes 110 for which identical network security policies have been designated. Such groups may also be formed using the network administration server 210 (both manually by the administrator and automatically, for example, by the domain names of the terminal nodes or by the IP addresses).

Figure 3:
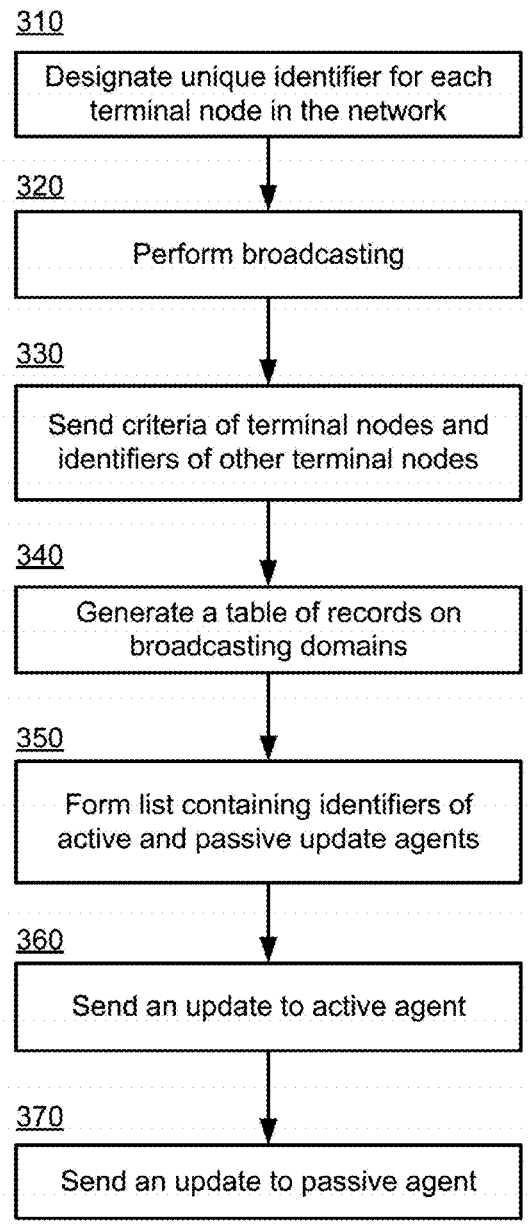
FIG. 3 is a flowchart illustrating an exemplary method for distributing software updates to terminal nodes in a network.

FIG. 3 is a flowchart illustrating an exemplary method for distributing software updates to terminal nodes in a network. In step 310, a unique identifier is assigned by the network administration server 210 to each terminal network node 110. In one exemplary aspect, the remote administration server may be a component of the corporate antivirus software.

In step 320, the security application 220 installed on the terminal network node 110 broadcasts the aforementioned identifier using, for example, the UDP protocol.

In step 330, the security application 220 installed on the terminal network node 110 transmits data to the network administration server 210. Said data may contain criteria that characterize said terminal node 110 as well as the set of identifiers of other terminal network nodes 110 in the same broadcast domain of said terminal node. The number of said identifiers in said set of identifiers may be limited by a value representing a maximum or a minimum. In an exemplary aspect, the security application 220 transmits said data to the network administration server 210 by, for example, means of the TCP protocol.

Criteria characterizing the terminal node 110 may include, but are not limited to:
 the speed of the CPU of the terminal network node 110;
 the amount of free space on the hard drives of the terminal network node 110;
 the domain suffix of the name of the terminal network node 110;
 the vulnerability of the software installed on the terminal network node 110;
 the time of uninterrupted operation of the terminal network node 110;
 the account of the user using the terminal network node 110; and
 the presence of a built-in battery in the terminal network node 110.

In step 340 the network administration server may 210 create a table of records on the broadcast domains of the network based on the data obtained from each security application 220, said data containing the set of unique identifiers of the other terminal network nodes 110, a broadcast domain being a network segment containing at least two terminal nodes 110, and the record on each broadcast domain in the table containing the identifiers of the terminal network nodes 110 that are visible to each other. Two terminal network nodes 110 are considered to be visible to each other if the network administration server 210 has received the identifier of the second terminal network node 110 from the first terminal network node 110 and the identifier of the first terminal network node 110 from the second terminal network node 110.

In step 350, the network administration server 210 based on the criteria data characterizing the terminal network nodes 110, generates a list containing the identifiers of the active 111 and passive 112 update agents. An update agent may be a terminal network node 110 of each broadcast domain whose identifier is contained in a record of the table so formed, and which is designated for distribution of software updates to the active agents 111, to the passive agents 112, and to the terminal network nodes 110 within the broadcast domain. An active update agent 111 receives updates from the network administration server 210 and other update agents, while a passive update agent 112 receives updates only from other update agents, both active 111 and passive 112. In one exemplary aspect, said software update may be a file containing the new version of a component of the operating system. In another exemplary aspect, said software update is a file containing the new version of a component of the security application. In yet another exemplary aspect, the software update is a file containing the new version of a component of an application installed on the terminal network node 110.

In step 360, the network administration server 210 transmits at least one update of the security application 220 of the active agent 111. In another exemplary aspect, said update is not sent out to the security applications 220 of other active agents 111.

In step 370 the security application 220 of the active agent 111 may transmit said update to the security application 220 of the passive agent 112. In this manner, the software updates are distributed to all terminal network nodes 110 in the network.

Figure 4:
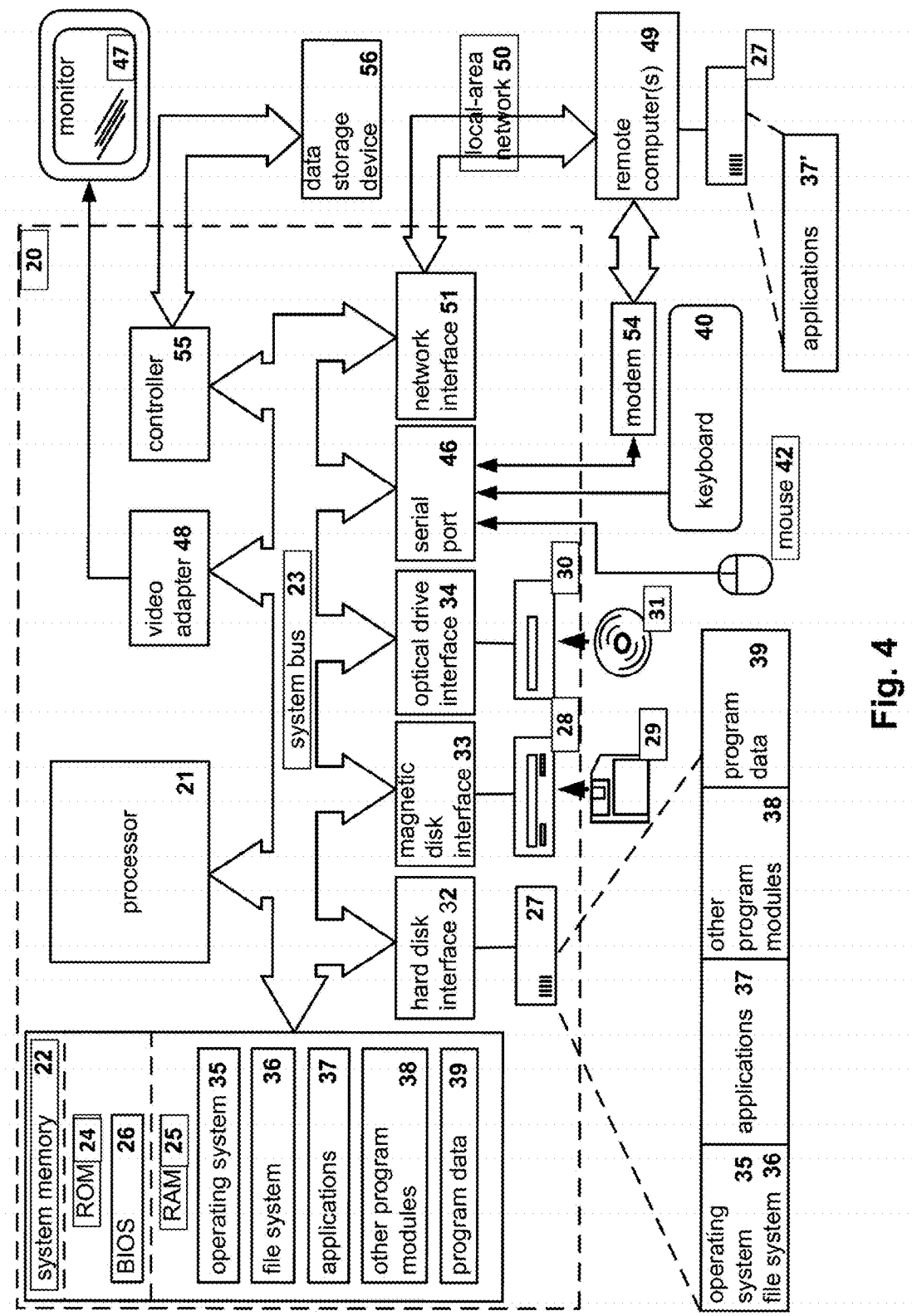
FIG. 4 is a diagram illustrating a general-purpose computer system on which aspects of systems and methods for distributing software updates may be implemented.

FIG. 4 is a diagram illustrating a general-purpose computer system on which aspects of systems and methods for distributing software updates may be implemented. As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for updating active and passive agents in a network comprising:

designating a unique identifier for each of a plurality of terminal node in a network of computing devices;

broadcasting the unique identifiers for the plurality of terminal nodes;

collecting criteria from the plurality of terminal nodes, the criteria indicating at least presence of security vulnerabilities on each terminal node and a set of unique identifiers for other terminal nodes in a same broadcast domain as the terminal node;

generating a list of terminal nodes that are active update agents and a list of terminal nodes that are passive update agents based on the collected criteria, wherein a number of active update agents in the generated list is calculated based on a number of the terminal nodes present in a broadcast domain;

transmitting one or more updates of a security application installed on the each terminal node to each terminal node that is an active update agent; and transmitting from each terminal node that is an active update agent, the one or more updates to each terminal node that is a passive update agent.

2. The method of claim 1, wherein the broadcasting is performed using the UDP protocol.

3. The method of claim 1, wherein the number of identifiers in the set of unique identifiers is limited by a value representing a maximum or a minimum.

4. The method of claim 1, wherein the criteria is a characteristic of a terminal node that describes one or more of the node's operating speed, location in the network, and/or the purpose of the node's use.

5. The method of claim 4, wherein the criteria includes one or more of:

a speed of a CPU of the terminal node;

an amount of free space on hard drives of the terminal node;

a domain suffix of a name of the terminal node;

presence of vulnerabilities in software installed on the terminal node;

a time of uninterrupted operation or "uptime" of the terminal node;

an account of a user using the terminal node; and presence of a built-in battery in the terminal node.

6. The method of claim 1, further comprising:

determining the number of update agents based on the number of terminal nodes in the broadcast domain.

7. The method of claim 1, further comprising:

selecting an active and passive update agent for an administration group, which includes a set of terminal nodes having identical network security policies.

8. The method of claim 1, further comprising:

changing an active update agent to a passive update agent based on one or more of the criteria.

9. A system for updating active and passive agents in a network, the system comprising:

a hardware processor configured to:

designate a unique identifier for each of a plurality of terminal node in a network of computing devices;

broadcast the unique identifiers for the plurality of terminal nodes;

collect criteria from the plurality of terminal nodes, the criteria indicating at least presence of security vulnerabilities on each terminal node and a set of unique identifiers for other terminal nodes in a same broadcast domain as the terminal node;

generate a list of terminal nodes that are active update agents and a list of terminal nodes that are passive update agents based on the collected criteria, wherein a number of active update agents in the generated list is calculated based on a number of the terminal nodes present in a broadcast domain;

transmit one or more updates of a security application installed on the each terminal node to each terminal node that is an active update agent; and transmit from each terminal node that is an active update agent, the one or more updates to each terminal node that is a passive update agent.

10. The system of claim 9, wherein the broadcasting is performed using the UDP protocol.

11. The system of claim 9, wherein the number of identifiers in the set of unique identifiers is limited by a value representing a maximum or a minimum.

12. The system of claim 9, wherein the criteria is a characteristic of a terminal node that describes one or more of the node's operating speed, location in the network, and/or the purpose of the node's use.

13. The system of claim 9, wherein the criteria includes one or more of:

a speed of a CPU of the terminal node;

an amount of free space on hard drives of the terminal node;

a domain suffix of a name of the terminal node;

presence of vulnerabilities in software installed on the terminal node;

a time of uninterrupted operation or "uptime" of the terminal node;

an account of a user using the terminal node; and presence of a built-in battery in the terminal node.

14. The system of claim 9, wherein the hardware processor is further configured to:

determine the number of update agents based on the number of terminal nodes in the broadcast domain.

15. The system of claim 9, wherein the hardware processor is further configured to:

select an active and passive update agent for an administration group, which includes a set of terminal nodes having identical network security policies.

16. The system of claim 9, wherein the hardware processor is further configured to:

change an active update agent to a passive update agent based on one or more of the criteria.

17. A non-transitory computer-readable medium storing instructions thereon for updating active and passive agents in a network, the instructions comprising:

designating a unique identifier for each of a plurality of terminal node in a network of computing devices;

broadcasting the unique identifiers for the plurality of terminal nodes;

collecting criteria from the plurality of terminal nodes, the criteria indicating at least presence of security vulnerabilities on each terminal node and a set of unique identifiers for other terminal nodes in a same broadcast domain as the terminal node;

generating a list of terminal nodes that are active update agents and a list of terminal nodes that are passive update agents based on the collected criteria, wherein a number of active update agents in the generated list is calculated based on a number of the terminal nodes present in a broadcast domain;

transmitting one or more updates of a security application installed on the each terminal node to each terminal node that is an active update agent; and transmitting from each terminal node that is an active update agent, the one or more updates to each terminal node that is a passive update agent.

18. The medium of claim 17, wherein the broadcasting is performed using the UDP protocol.

19. The medium of claim 17, wherein the criteria is a characteristic of a terminal node that describes one or more of the node's operating speed, location in the network, and/or the purpose of the node's use.

20. The medium of claim 17, wherein the criteria includes one or more of:
- a speed of a CPU of the terminal node;
- an amount of free space on hard drives of the terminal node;
- a domain suffix of a name of the terminal node;
- presence of vulnerabilities in software installed on the terminal node;
- a time of uninterrupted operation or "uptime" of the terminal node;
- an account of a user using the terminal node; and
- presence of a built-in battery in the terminal node.

\* \* \* \* \*